Jan. 18, 1927.

H. M. PFLAGER

CAR TRUCK

Filed March 23, 1926

1,614,687

INVENTOR
HARRY M. PFLAGER

By Cornwall, Kedell, James
ATTYS.

Patented Jan. 18, 1927.

1,614,687

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK.

Application filed March 23, 1926. Serial No. 96,733.

My invention relates to railway rolling stock and consists in an improved truck structure particularly adapted for use on tenders and passenger cars but which may be used to special advantage on any car having low center plates and side bearings.

The general object of my invention is to provide, in a truck where the spring plank and bolster are much closer to each other than ordinary, a spring support which will provide for the usual spring movement and produce the easy riding qualities present in the ordinary truck structure in which there is ample space between the spring plank and bolster for the insertion and operation of the usual elliptic springs.

I attain this general object by a bolster of inverted U-shape and by the use of semi-elliptic springs for supporting the bolster from the spring plank.

Detail objects of my invention are to provide for movement of the bolster with the spring as the latter moves transversely of the truck with the swinging spring plank and at the same time to provide for necessary movement between the spring and bolster to accommodate the lengthening of the spring when compressed.

Another object of my invention is to provide removable plates for bolster bearings on the spring.

Other detail objects of my invention will be referred to in the specification and drawings, in which drawings—

Figure 1:
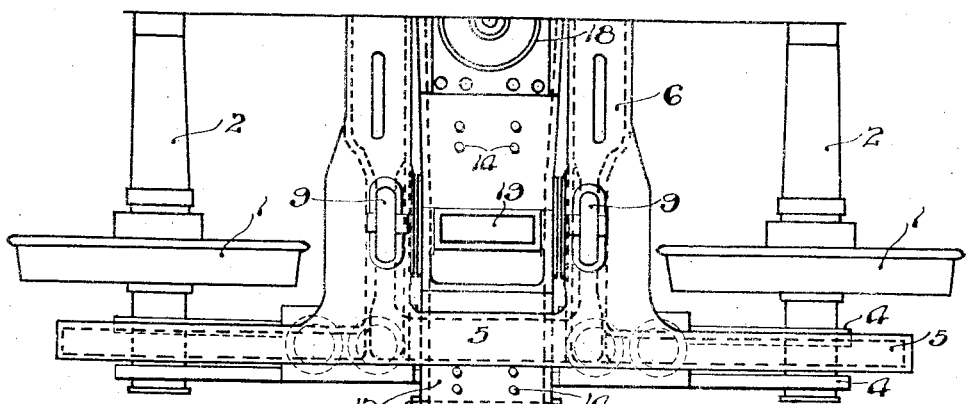
Figure 1 is a top view of one longitudinal half of a four wheel car truck embodying my invention.
Figure 2:
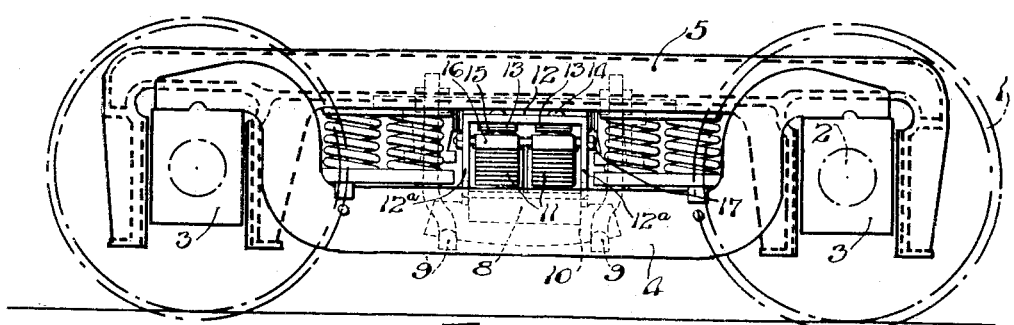
Figure 2 is a side elevation of the same.
Figure 3:
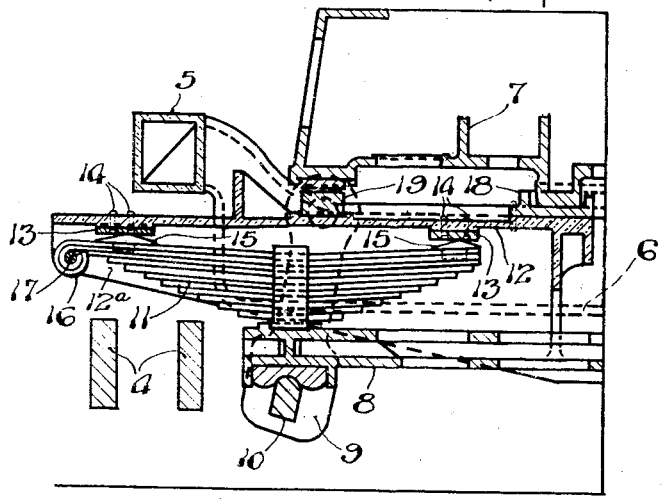
Figure 3 is a transverse vertical section taken on the center line of the truck.

The car truck includes the usual wheels 1, axles 2, journal boxes 3, double equalizer bars 4, and a frame comprising wheel pieces 5, and transoms 6 depressed between the wheel pieces to accommodate the low underframe 7 of a tender. A spring plank 8 is swung from transoms 6 by hangers 9 which support the spring plank through a cross bar 10.

The spring plank 8 mounts leaf springs 11 in the usual manner but each spring 11 is of semi-elliptic form instead of the usual elliptic spring used in similar trucks.

A bolster 12 of inverted U-shape is mounted on springs 11, the vertical walls 12$^a$ of the bolster being adjacent the sides of the springs 11, the bolster thereby forming a housing for the springs. At the points of support for the bolster by the springs I provide renewable wear plates 13 which may be secured to the top wall of the bolster by rivets 14 or by other suitable means, and cooperating bearing elements 15 are carried by the corresponding portions of the spring. Preferably one or both of the elements 13 and 15 will be formed of hardened steel. The outer ends of the top leaves of the spring are shown as having a return bend 16 through which a bolt 17 may pass. Bolt 17 also passes through the vertical walls 12$^a$ of the bolster. By means of this connection, the bolster and spring plank will move together substantially when the momentum or inertia of the load is exerted transversely of the truck. Suitable center plate 18 and side bearings 19 are provided on the bolster and these elements are below the level of the wheel piece 5.

With the construction described, the bolster extends outwardly between the wheel piece 5 and equalizer bars 4 and is supported at a point over the equalizer bars and at an inner point spaced substantially from the outer support. This arrangement enables me to use a spring with much longer centers than is usually provided with the elliptic spring and enables me to support the bolster at a much greater distance from the center line of the car than is possible with the usual elliptic spring. These conditions make for a much easier riding truck.

While the lowering of the bolster and the lateral extension of the same afford substantial advantages for many classes of equipment, it is apparent that my novel spring arrangement may be used with trucks in which the lowered bolster would not be necessary and in which box-shaped or other forms of bolsters are embodied. I contemplate such and other modifications in the principles of using my invention as are included in the scope of my claims.

I claim:

1. In a railway truck, a spring plank, semi-elliptic springs mounted on the ends of said spring plank, and a bolster supported by said springs.

2. In a railway truck, a spring plank, semi-elliptic springs mounted on the ends of said spring plank, and a bolster having an upper horizontal wall supported by said springs and having one or more depending walls at the side of said spring.

3. In a railway truck, a spring plank, semi-elliptic springs with their center portions mounted on the ends of said spring plank, and a bolster of inverted U-shape extending beyond the ends of said spring plank and supported upon and housing said springs.

4. In a railway truck, a spring plank, semi-elliptic springs carried on the ends thereof, and a bolster of inverted U-shape, the legs of said bolster being secured to one end of each of said springs and the horizontal wall of said bolster resting on said springs.

5. In a railway truck, a spring plank, spaced semi-elliptic springs each carried thereon at a single point, and a bolster supported by each of said springs at spaced points.

6. In a railway truck, a spring plank, a bolster, a semi-elliptic spring carried on said spring plank and fixed thereto at a single point and fixed to said bolster and slidably supporting said bolster at spaced points.

7. In a railway truck, a spring plank, a semi-elliptic spring carried thereon, and a bolster supported by said spring, one end of said spring being secured to said bolster to insure their movement together and the other end of said spring being free to move along said bolster to permit spring compression.

8. In a railway truck, a spring plank, a semi-elliptic spring mounted thereon, the end of said spring having a return bend, a bolster supported on said spring, and an element secured to said bolster and engaging said return bend.

9. In a railway truck, an equalizer bar, a spring plank terminating short of said equalizer bar, a spring carried on said spring plank and extending outwardly beyond the end of the latter over said equalizer bar, and a bolster extending over said equalizer bar and supported by said spring near its outer end and at a point near the center of the truck.

10. In a railway truck, a spring plank, a semi-elliptic spring carried on one end of said spring plank with one end extending outwardly beyond the end of the spring plank, and a bolster extending over the outer end of said spring and supported thereby.

11. In a railway truck, a frame including a wheel piece, a spring plank, semi-elliptic springs mounted near the end of said plank, a bolster carried on said springs, and side bearings on said bolster below the level of said wheel piece.

12. In a railway truck, a frame including a wheel piece, a spring plank, a semi-elliptic spring on said plank, a bolster carried on said spring and extending beneath said wheel piece, and a side bearing on said bolster below the level of the top of said wheel piece.

13. In a railway truck, a spring plank, a semi-elliptic spring carried thereby, a bolster carried by said spring and secured to one end of said spring.

14. In a railway car truck, a spring plank, a bolster extending outwardly beyond the end of said spring plank, and spaced spring members on said spring plank for supporting said bolster at a point beyond the end of said spring plank.

In testimony whereof I hereunto affix my signature this 19 day of March, 1926.

H. M. PFLAGER.